United States Patent [19]
Hongo

[11] Patent Number: 5,461,652
[45] Date of Patent: Oct. 24, 1995

[54] CLOCK CONTROL CIRCUIT

[75] Inventor: Katsunobu Hongo, Itami, Japan

[73] Assignee: Mitsubishi Denki Kabushiki Kaisha, Tokyo, Japan

[21] Appl. No.: 387,699

[22] Filed: Feb. 13, 1995

[30] Foreign Application Priority Data

Apr. 6, 1994 [JP] Japan .................................. 6-068423

[51] Int. Cl.⁶ .............................. G04B 47/00; G04F 5/00
[52] U.S. Cl. .......................... 368/10; 364/707; 395/750
[58] Field of Search .......................... 368/10, 155, 156; 331/46, 49; 364/707, 934, 934.51; 395/550, 750

[56] References Cited

U.S. PATENT DOCUMENTS

| | | | |
|---|---|---|---|
| 4,264,967 | 4/1981 | Fujita et al. | 368/156 |
| 4,437,302 | 1/1984 | Watanabe | 368/200 |
| 5,025,387 | 6/1991 | Frame . | |
| 5,315,566 | 5/1994 | Stein | 368/46 |

*Primary Examiner*—Vit W. Miska
*Attorney, Agent, or Firm*—Lowe, Price, LeBlanc & Becker

[57] ABSTRACT

A clock control circuit built in a microcomputer, wherein the supply of a system clock to peripherals that are not required to be always operated is suspended in the wait state where the supply of the system clock to a CPU is suspended, thereby decreasing a power to be consumed.

16 Claims, 12 Drawing Sheets

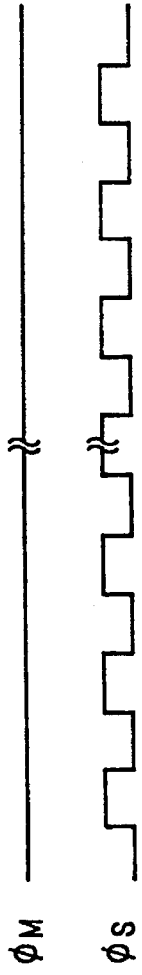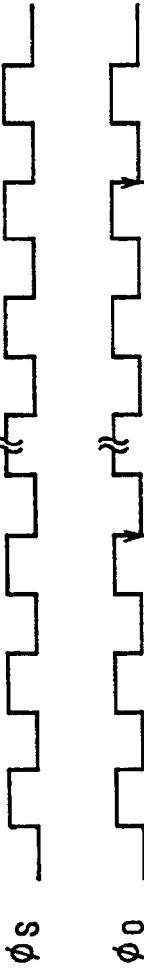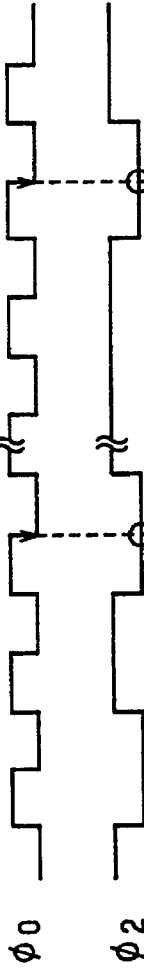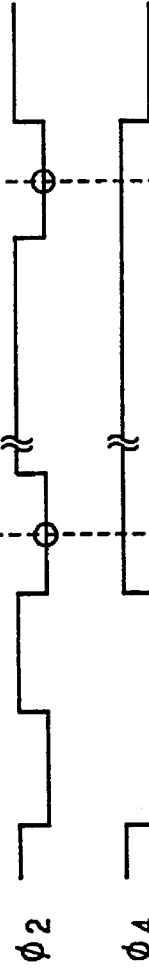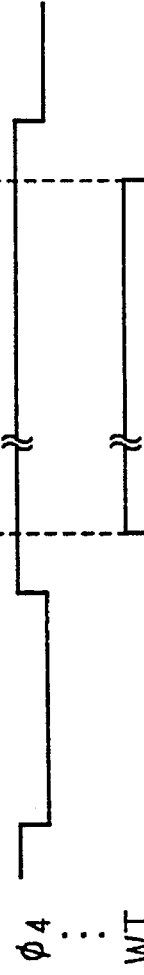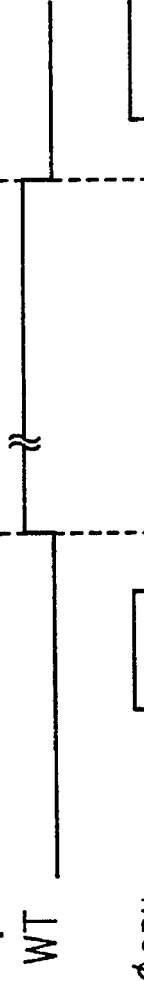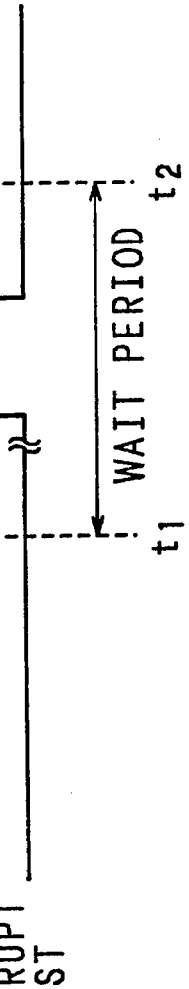
FIG. 3(A) PRIOR ART  $\phi_M$
FIG. 3(B) PRIOR ART  $\phi_S$
FIG. 3(C) PRIOR ART  $\phi_0$
FIG. 3(D) PRIOR ART  $\phi_2$
FIG. 3(E) PRIOR ART  $\phi_4$
FIG. 3(F) PRIOR ART  WT
FIG. 3(G) PRIOR ART  $\phi_{CPU}$
FIG. 3(H) PRIOR ART  INTERRUPT REQUEST

CLOCK CONTROL CIRCUIT

BACKGROUND OF THE INVENTION

1. Field of the Invention

The present invention relates to a clock control circuit built in a microcomputer comprising a main oscillator for a high speed operation and a sub oscillator for a low speed operation.

2. Description of Related Art

Some microcomputers, such as those having a timing function and those performing a low speed operation for saving a consumed power in addition to a high speed operation, conventionally include a sub oscillator for a low speed operation as well as a main clock oscillator for a high speed operation. The main clock oscillator generally has an oscillating frequency of 1 MHz or more, and tile sub oscillator has an oscillating frequency of approximately 32 KHz. In this type of microcomputer, a main clock generated by the main clock oscillator is generally used as a system clock in the high speed operation. In the low speed operation, it is not that a clock obtained by dividing the main clock is used but that, a sub clock generated by the sub oscillator is used instead. Further, the microcomputer has a function to stop generating the main clock in the low speed operation so as to decrease a power to be consumed.

Some of such microcomputers further have, for example, a wait function to further decrease the power consumption. The wait function is a function for suspending the supply of a clock signal to a CPU without halting the oscillator when a processing operation is not performed or when the CPU can be suspended (put in a wait state) except for a period when any external factor occurs. This function is used when the processing operation is conducted at predetermined time intervals or when the processing operation by the CPU is not required until any external factor such as external interrupt occurs. When this function is used, the power consumed by the microcomputer can be decreased by 20% through 40% as compared with when the CPU performs the ordinary processing operation.

By adopting both the sub clock and the wait function in this manner, the sub clock alone is generated and the generation of the main clock is suspended in the wait state when the operation of the CPU is halted, thereby stopping the supply of the system clock to tile CPU. Therefore, the power to be consumed can be further decreased. This mechanism is particularly significant in a product such as a portable telephone that uses a battery as a power supply and has to be kept with the power supply on for a long period of time.

A conventional clock control circuit for controlling this mechanism will now be described.

FIG. 1 is a block diagram showing the configuration of a conventional clock control circuit built in a microcomputer. As is shown in FIG. 1, reference numeral 1 denotes a main oscillator and reference numeral 2 denotes a sub oscillator. A main clock $\phi_M$ generated by a main oscillator 1 and a sub clock $\phi_S$ generated by a sub oscillator 2 are inputted to a clock selecting circuit 3. A signal $M_{STP}$ generated by main clock suspension selecting means 7 is inputted to one input terminal of an AND gate 71, and a control signal $C_{SEL}$ generated by system clock specifying means 6 is inputted to the other input terminal of the AND gate 71. The output of the AND gate 71 is supplied to the main oscillator 1. The control signal $C_{SEL}$ outputted by the system clock specifying means 6 is also supplied to the clock selecting circuit 3 via an inverter 61.

FIG. 2 is a diagram of the function block in the clock selecting circuit 3, and illustrates the clock selecting function of the clock selecting circuit. 3. A switch portion 35 includes NAND gates 31 and 32 and a NOR gate 33 (shown in FIG. 1). As described above, the sub clock $\phi_S$ is inputted to one input terminal of the NAND gate 31, and the control signal $C_{SEL}$ is inputted to the other input terminal thereof. The main clock $\phi_M$ is inputted to one input terminal of the NAND gate 32, and an inverted signal of the control signal $C_{SEL}$ is inputted to the other input terminal thereof. The outputs of the NAND gates 31 and 32 are supplied to the NOR gate 33, whose output is supplied to a clock buffer 34. In this manner, the switch portion 35 selects either the main clock $\phi_M$ or the sub clock $\phi_S$, and the selected clock is amplified by the clock buffer 34 to be supplied to a second frequency divider circuit 4 as a system clock $\phi_0$.

The main oscillator 1 and the sub oscillator 2 are actuated by connecting a predetermined vibrator, a capacity and the like between external terminals $X_{IN}$ and $X_{OUT}$ of the main oscillator 1 and between external terminals $X_{CIN}$ and $X_{COUT}$ of the sub oscillator 2, respectively.

The second frequency divider circuit 4 includes T flip-flops 41, 42, 43, . . . , etc. connected in series. The system clock $\phi_0$ inputted to the second frequency divider circuit 4 is divided by the T flip-flops 41, 42, 43, . . . , etc., thereby being outputted as divided clocks $\phi_2, \phi_4, \ldots, \phi_n$ and $\phi_m$, respectively.

The sub clock $\phi_S$ is inputted to a first frequency divider circuit 9 including a first T flip-flop 91 to be divided, and the obtained divided clock $\phi_{S2}$ is supplied to a selection terminal of a switch 110. Also, the divided clocks $\phi_2, \phi_4, \ldots, \phi_n$ and $\phi_m$ generated by the second frequency divider circuit 4 are supplied to the selection terminal of the switch 110. Through the switching function of the switch 110, the clock $\phi_{S2}$ or the divided clocks $\phi_2, \phi_4, \ldots, \phi_n$ and $\phi_m$ is inputted to a timer 10 for a clock.

A wait control circuit 5 receives various signals such as a wait instruction, an interrupt request, a reset request, a system clock $\phi_0$ and a divided clock $\phi_2$, thereby controlling the wait function. An output signal WT generated by the wait control circuit 5 is inputted to an inverter 51. An inverted signal of the signal WT generated by the inverter 51 is supplied to one input terminal of a NAND gate 52, the other input terminal of which receives the divided clock $\phi_2$. A signal $\phi_{CPU}$ generated by the NAND gate 52 is supplied to a CPU (not shown).

FIG. 3 is a timing chart for the operation of the clock control circuit having the aforementioned configuration before, during and after the wait state. The operation in the wait state will be described referring to this timing chart and FIG. 1.

For transition to the wait state where the supply of the signal $\phi_{CPU}$, that is, a clock source for the CPU, is suspended, the CPU activates the control signal $C_{SEL}$ generated by the system clock specifying means 6, thereby allowing the clock selecting circuit 3 to select the sub clock $\phi_S$ for the low speed operation. Therefore, the sub clock $\phi_S$ is used as the system clock $\phi_0$. Then, the signal $M_{STP}$ generated by the main clock suspension selecting means 7 is activated, thereby suspending the oscillation of the main oscillator 1. At this point, the main clock $\phi_M$ undergoes a high to low transition. From this time on, as is shown in the timing chart of FIG. 3, the divided clocks $\phi_2, \phi_4, \ldots, \phi_n$ and $\phi_m$ outputted by the second frequency divider circuit 4 and the signal $\phi_{CPU}$ are synchronized with the system clock $\phi_0$, respectively. The divided clocks $\phi_2, \phi_4, \ldots, \phi_n$ and $\phi_m$ work as clock sources for peripherals built in the microcomputer such as a timer, a serial I/O, an A/D converter and a watch dog timer.

Next, at a timing when the divided clock $\phi_2$ is at a low level and the system clock $\phi_0$ is at a fall, i.e., at a time $t_1$ in FIG. 3, the CPU executes wait instruction, namely, the output signal WT of the wait control circuit 5 undergoes a low to high transition. As a result, the signal WT is inverted by the inverter 51 to be supplied to the AND gate 52, thereby making the signal $\phi_{CPU}$ undergo a high to low transition. Thus, the supply of the clock signal to the CPU is suspended, resulting in halting the CPU.

Even when the CPU is halted, however, the second frequency divider circuit 4 is operated to generate the divided clocks $\phi_2, \phi_4, \ldots, \phi_n$ and $\phi_m$. Therefore, the peripherals supplied with the divided clocks $\phi_2, \phi_4, \ldots, \phi_n$ and $\phi_m$ are also operated even while the CPU is being suspended. Also, the first frequency divider circuit 4 is operated even when the CPU is suspended, and generates the divided clock $\phi_{S2}$ by dividing the sub clock $\phi_S$. Therefore, the timer 10 supplied with the divided clock $\phi_{S2}$ is also operated.

In such a wait state, when an interrupt request is made due to, for example, the overflow of the timer 10, the wait control circuit 5 makes the output signal WT undergo a high to low transition at a timing when the divided clock $\phi_2$ is at a low level and the system clock $\phi_0$ is at, a fall, i.e., at a time $t_2$ in FIG. 3. As a result, the wait state is released. From this time on, the supply of the signal $\phi_{CPU}$ is started, thereby resuming the operation of the CPU. The period between the times $t_1$ and $t_2$ is designated as a wait period.

Since the conventional clock control circuit works as described above, the clock selecting circuit 3 and tile second frequency divider circuit 4 are continued to be operated to supply the system clock $\phi_0$ and the divided clocks $\phi_2, \phi_4, \ldots, \phi_n$ and $\phi_m$, even when the timer 10 alone is used for the purpose of releasing tile wait state and the other peripherals except for the timer 10 are not used at all before the release of the wait state. In such a case, the peripherals are regarded to waste the power.

In particular, since the NAND gate 33, the clock buffer 34, and the T flip-flops 41, 42, . . . , etc. are inherently designed to be suitable for a high speed operation, the transistors contained therein have large driving ability. Therefore, even when they are driven by using the sub clock $\phi_S$ for the low speed operation, a feedthrough current at a switching operation and a power consumed by a charge/discharge current for a load capacity cannot be negligible. For example, in a microcomputer manufactured by the Applicant, these transistors consume 20% through 30% of the entire power consumed in the wait state using the sub clock $\phi_S$.

Further, the timer 10 is also operated by using, as the clock source, the divided clocks $\phi_2, \phi_4, \ldots, \phi_n$ and $\phi_m$ obtained by dividing the main clock $\phi_M$ for the high speed operation. Therefore, a plurality of bits of counters are required to count, synchronously with one inputted clock, resulting in consuming a large power. Since the timer 10 for the clock using the sub clock $\phi_S$ as a clock source does not require a high frequency, a clock frequency of the timer 10 can be lower than the sub clock $\phi_S$. Therefore, the divided clock $\phi_{2S}$, that is, a halved clock of the sub clock $\phi_S$, is actually used.

SUMMARY OF THE INVENTION

The present invention was devised to solve the aforementioned problems, and one of the objectives of the invention is providing a clock control circuit in which a system clock is suspended to be supplied to peripherals that are not required to be always operated in the wait state where the supply of the system clock to a CPU is suspended, thereby further decreasing a power to be consumed therein.

The clock control circuit of the invention comprises a clock selecting circuit for selecting as a system clock one of clocks generated by a first oscillator for a high speed operation and by a second oscillator for a low speed operation, a wait control circuit for controlling the setting/releasing of the wait state, system clock suspension instructing means for instructing the suspension of the output of said system clock from said clock selecting circuit, and means for suspending the output of the system clock when the suspension of the output of said system clock is instructed.

Alternatively, the clock control circuit of the invention comprises a clock selecting circuit for selecting as a system clock one of clocks generated by a first oscillator for a high speed operation and by a second oscillator for a low speed operation, a wait control circuit, for controlling the setting/releasing of the wait state, system clock suspension instructing means for instructing the suspension of the output of said system clock from said clock selecting circuit, and means for interrupting the transfer of the clock from said second oscillator to said clock selecting circuit and/or means for interrupting the transfer of the clock from said first oscillator to said clock selecting circuit when the suspension of the output of said system clock is instructed.

Accordingly, the system clock is supplied to a minimum necessary numbers of peripherals in the wait state, thereby decreasing a power to be consumed.

In the clock control circuit of the invention, the system clock suspension instructing means includes a register, which is constructed so as to be released when said wait control circuit releases the wait state.

The clock control circuit of the invention further comprises a timer using the clock generated by said second oscillator or a divided clock thereof as a clock source. The timer receives either the clock generated by the second oscillator or the divided clock even when tile output of the system clock from the clock selecting circuit is suspended. Said wait control circuit releases the wait state when an overflow signal is outputted by the timer.

Alternatively, the clock control circuit of the invention further comprises a timer using tile clock generated by said second oscillator or a divided clock thereof as a clock source. The timer receives either the clock generated by said second oscillator or the divided clock even when the output of the system clock from said clock selecting circuit is suspended. Said wait control circuit releases the wait state when the wait control circuit receives a signal corresponding to a set value written in the timer.

Accordingly, the wait state is released when a period set in said timer is expired.

Alternatively, the clock control circuit of the invention further comprises a timer using the clock generated by said second oscillator or a divided clock thereof as a clock source, and receiving either the clock generated by said second oscillator or the divided clock even when the output of the system clock from said clock selecting circuit is suspended; and decision means for deciding whether or not a set value has been written in the timer. Said system clock suspension instructing means is placed into an output enable state when the decision means decides that said set value has been written in the timer.

Accordingly, such a problem would not happen that the system clock is suspended and the wait state cannot be released because a set value is not written in the timer.

Further, in the clock control circuit of the invention, the divided clock supplied to said timer is divided four times or more. Accordingly, the power to be consumed in the wait state is further decreased.

The above and further objects and features of the invention will more fully be apparent from the following detailed description with accompanying drawings.

BRIEF DESCRIPTION OF THE DRAWINGS

FIG. 3 is a timing chart showing the operation of the conventional clock control circuit before, during and after a wait state;

DESCRIPTION OF THE PREFERRED EMBODIMENTS

The present invention will now be described referring to the accompanying drawings illustrating the embodiments thereof.

Figure 1:
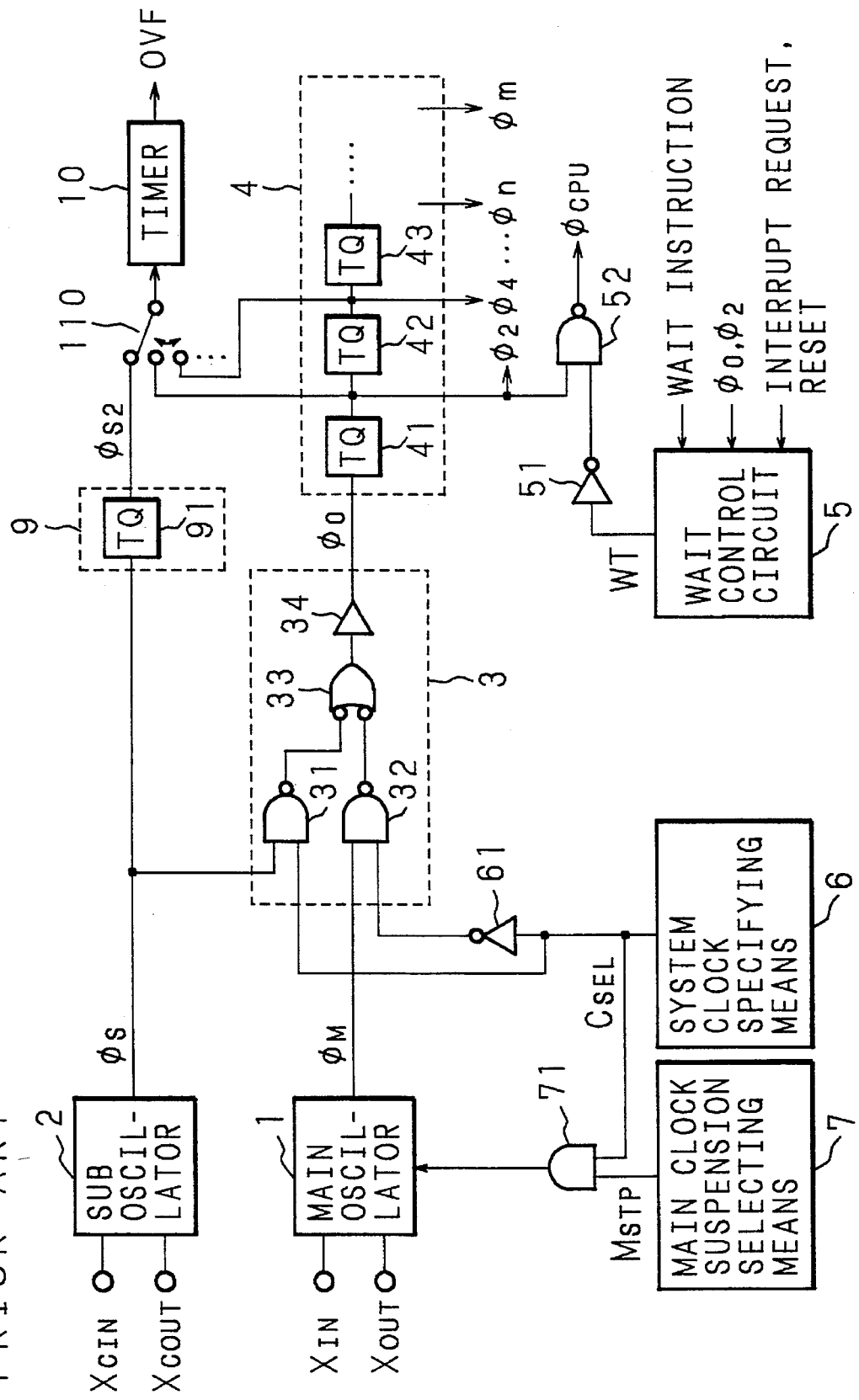
FIG. 1 is a block diagram of a conventional clock control circuit.
Figure 2:
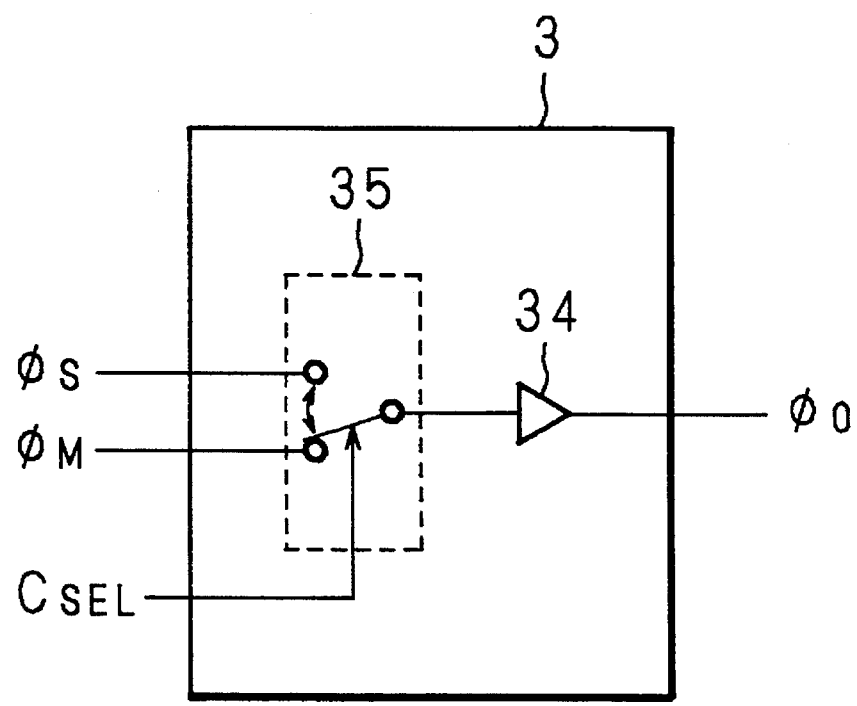
FIG. 2 is a diagram of a functional block in the conventional clock control circuit of FIG. 1.
Figure 4:
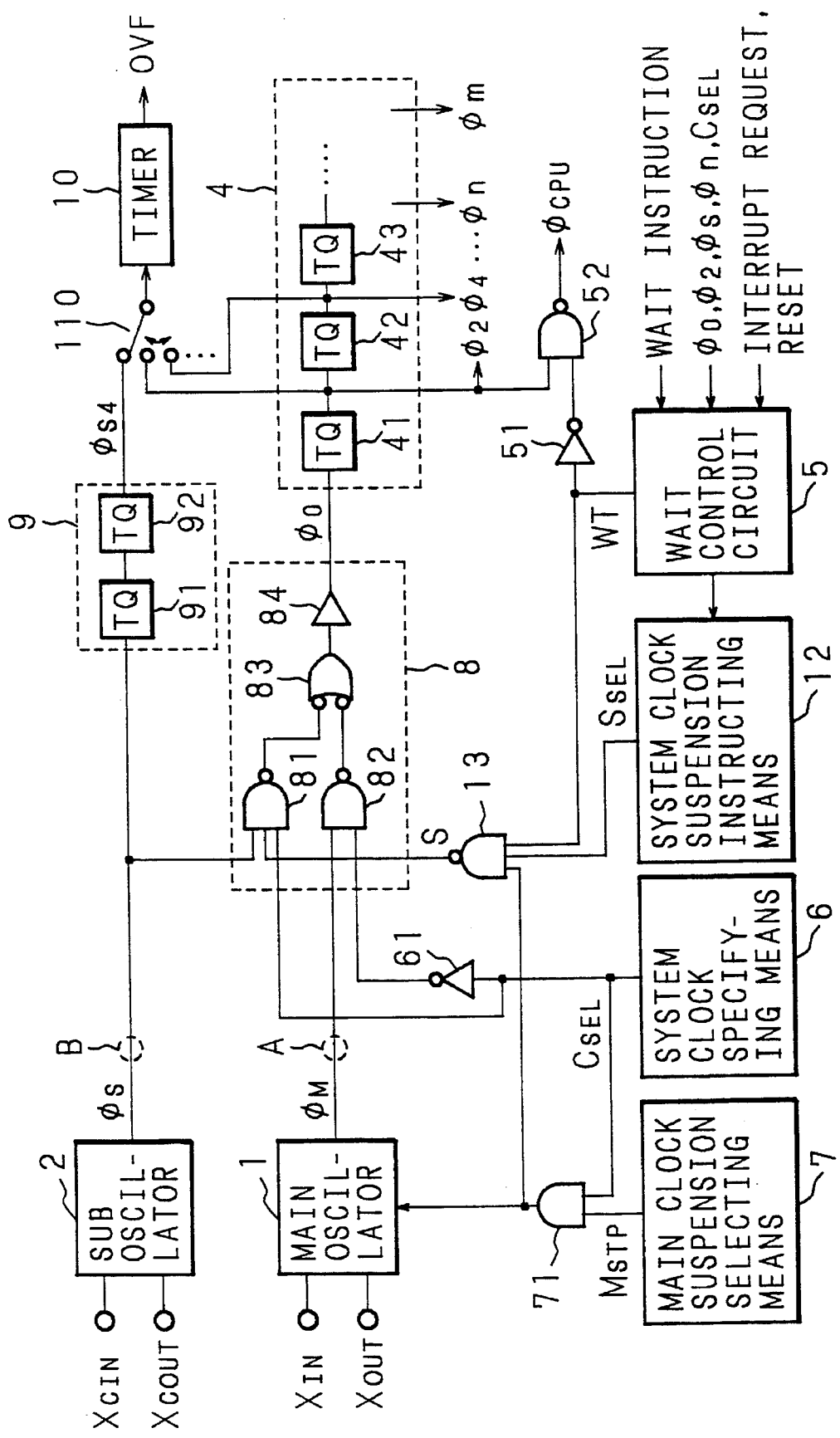
FIG. 4 is a block diagram of a clock control circuit according to one embodiment of the present invention.

FIG. 4 is a block diagram of a clock control circuit built in a microcomputer according to the invention, As is shown in FIG. 4 the clock control circuit includes a first oscillator (hereinafter referred to as the main oscillator) 1 for a high speed operation and a second oscillator (hereinafter referred to as the sub oscillator) 2 for a low speed operation. A main clock $\phi_M$ generated by the main oscillator 1 and a sub clock $\phi_S$ generated by the sub oscillator 2 are inputted to a clock selecting circuit 8. A signal $M_{STP}$ generated by main clock suspension selecting means 7 is supplied to one input terminal of an AND gate 71, and a control signal $C_{SEL}$ generated by system clock specifying means 6 is supplied to the other input terminal of the AND gate 71. The output of the AND gate 71 is supplied to the main oscillator 1. The control signal $C_{SEL}$ generated by system clock specifying means 6 is also supplied to the clock selecting circuit 8 via an inverter 61.

A suspension instructing signal $S_{SEL}$ generated by system clock suspension instructing means 12, that is, one of the features of the present invention, is supplied to a first input terminal of a NAND gate 13, whose second and third input terminals receive an output signal WT generated by a wait control circuit 5 described below and an output signal of the AND gate 71, respectively. The output S of the NAND gate 13 is supplied to a NAND gate 81 in the clock selecting circuit 8.

Figure 5:
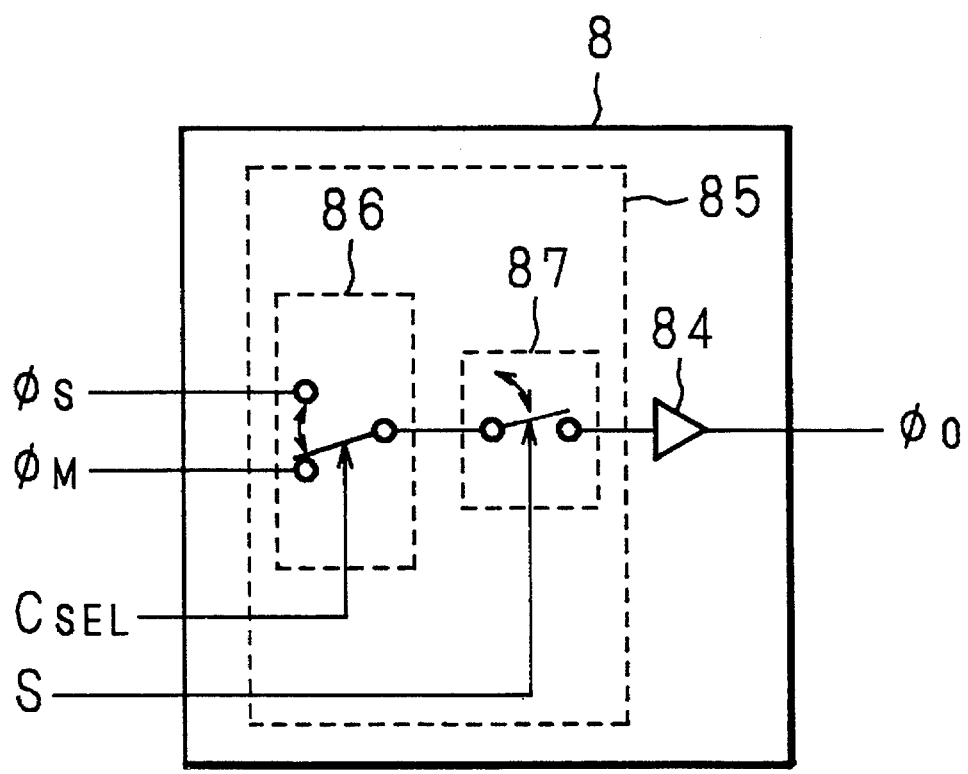
FIG. 5 is a diagram of a functional block in the clock control circuit of FIG. 4.
Figure 6:
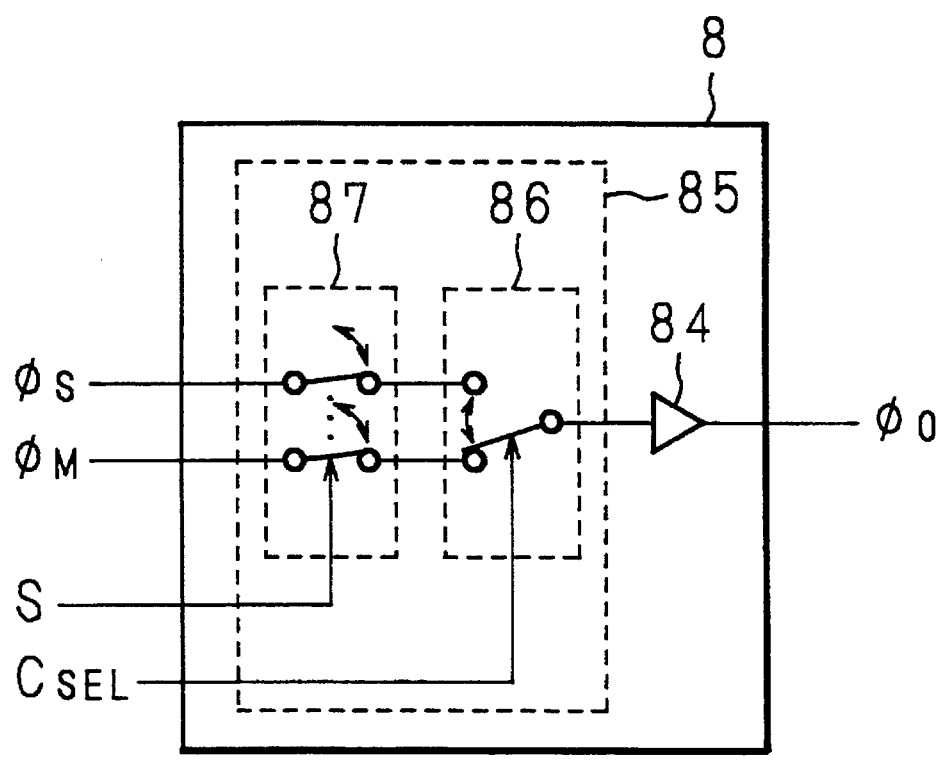
FIG. 6 is a diagram of another type of functional block in the clock control circuit of FIG. 4.

FIGS. 5 and 6 are diagrams showing exemplified configurations of a functional block in the clock selecting circuit 8. Both the configurations shown in FIGS. 5 and 6 attain substantially the same clock selecting function of the clock selecting circuit 8. The clock selecting circuit 8 of this embodiment includes a switch portion 85 and a clock buffer 84, and the switch portion 85 is constructed with NAND gates 81 and 82 and a NOR gate 83 (shown in FIG. 4). The switch portion 85 includes a first switch portion 86 having a clock selecting function and a second switch portion 87 having a halting or interrupting function for a signal. As described above, the sub clock $\phi_S$, the output signal S and the control signal $C_{SEL}$ are supplied to the input terminal of the NAND gate 81. The main clock $\phi_M$ is supplied to one input terminal of the NAND gate 82, and an inverted signal of the control signal $C_{SEL}$ is supplied to the other input terminal of the NAND gate 82. The outputs of the NAND gates 81 and 82 are supplied to the NOR gate 83, whose output is supplied to the clock buffer 84. The clock buffer 84 amplifies the received signal and outputs the amplified signal to a second frequency divider circuit 4 as a system clock $\phi_0$. When the signal is interrupted by the second switch portion 87, the output of the system clock $\phi_0$ is suspended.

The main oscillator 1 and the sub oscillator 2 are actuated by connecting a predetermined vibrator, a capacity and the like between external terminals $X_{IN}$ and $X_{OUT}$ of the main oscillator 1 and between external terminals $X_{CIN}$ and $X_{COUT}$ of the sub oscillator 2, respectively.

The second frequency divider circuit 4 includes T flip-flops 41, 42, 43, . . . , etc. connected in series. The system clock $\phi_0$ inputted to the second frequency divider circuit 4 is divided by the T flip-flops 41, 42, 43, etc., thereby being output ted as divided clocks $\phi_2, \phi_4, \ldots, \phi_n$ and $\phi_m$, respectively.

The sub clock $\phi_S$ is inputted to a first frequency divider circuit 9 including first and second T flip-flops 91 and 92 to be successively divided, and the obtained divided clock $\phi_{S4}$ is supplied to a selection terminal of a switch 110. Also, the divided clocks $\phi_2, \phi_4, \ldots, \phi_n$ and $\phi_m$ generated by the second frequency divider circuit 4 are supplied to the selection terminal of the switch 110. Through the switching function of the switch 110, the clock $\phi_{S4}$ or the divided clocks $\phi_2, \phi_4, \ldots, \phi_n$ and $\phi_m$ is inputted to a timer 10 for a clock.

The wait control circuit 5 receives various signals such as a wait instruction, an interrupt request, a reset request, a system clock $\phi_0$ and a divided clock $\phi_2$, thereby controlling the wait function. The output signal WT generated by the wait control circuit 5 is inputted to an inverter 51 and the NAND gate 13 An inverted signal of the signal WT generated by the inverter 51 is supplied to one input terminal of a NAND gate 52 the other input terminal of which receives the divided clock $\phi_2$, A signal $\phi_{CPU}$ generated by the NAND gate 52 is supplied to a CPU (not shown).

Figure 7:
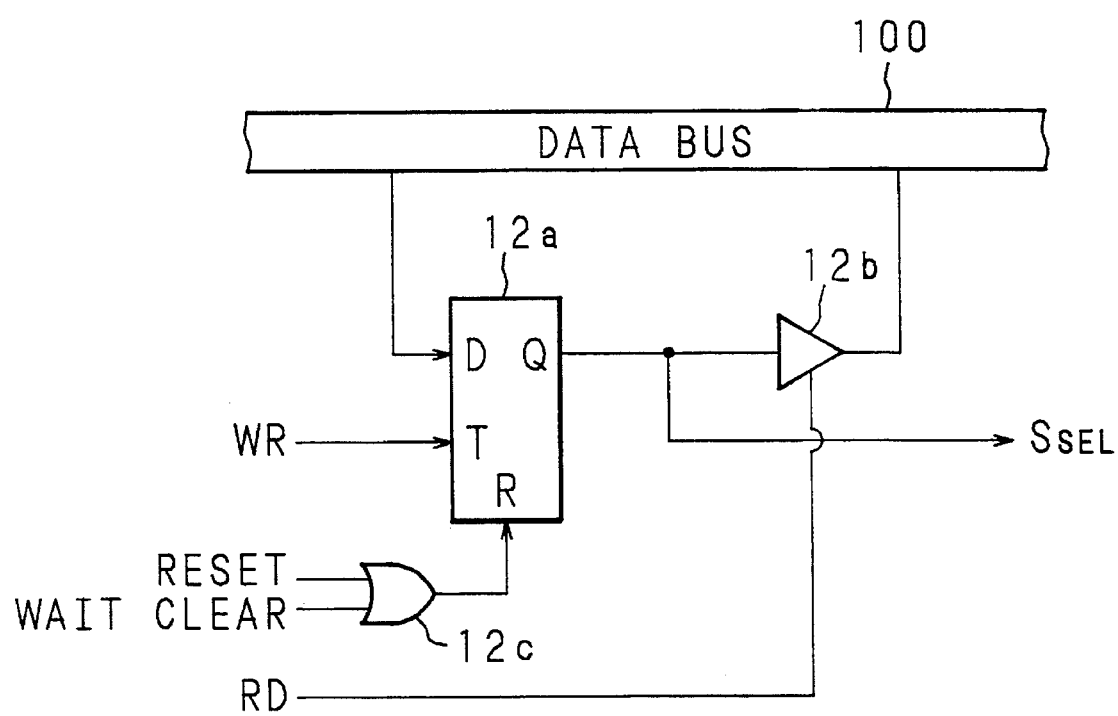
FIG. 7 is a circuit diagram showing an exemplified configuration of system clock suspension selecting means according to one embodiment of the invention.

FIG. 7 is a circuit diagram showing an exemplified configuration of the system clock suspension instructing means 12. A data in a data bus 100 in the microcomputer is latched by a D flip-flop 12a synchronously with a write signal WR. A try state buffer 12b receives a suspension instructing signal $S_{SEL}$ from the D flip-flop 12a, and supplies its output to the data bus 100 under control of a read signal RD. An OR gate 12c is a circuit for outputting a logical sum of a reset signal and a wait clear signal. The wait clear signal is outputted by the wait control circuit 5 for releasing the wait state, and is outputted at a time $t_2$ described referring to FIG. 8 below.

Figure 8:
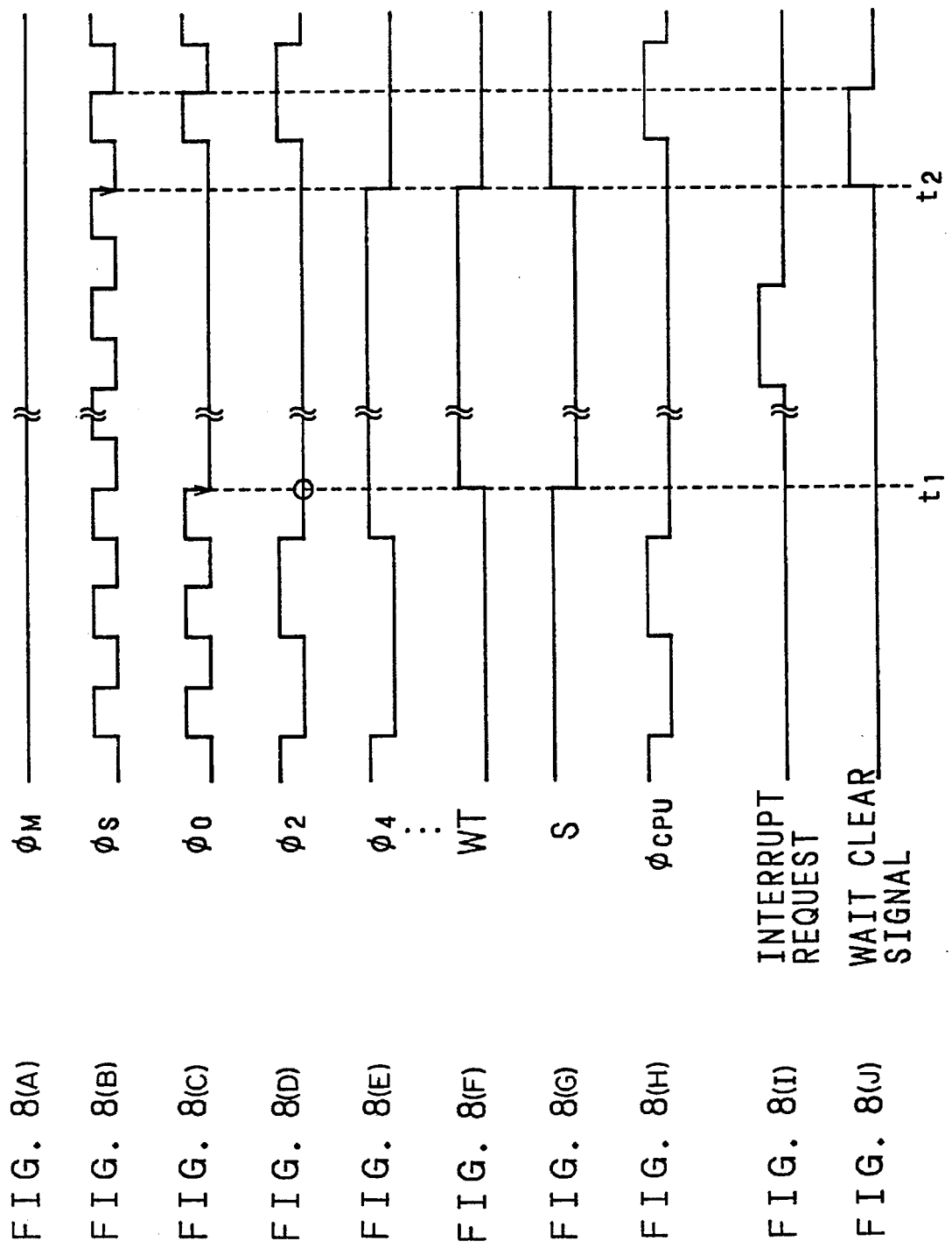
FIG. 8 is a timing chart of the operation of the clock control circuit of the invention before, during and after the wait state.

The wait, function by the clock control circuit having the aforementioned configuration will now be described. FIG. 8 is a timing chart showing the operation of this clock control circuit before, during and after the wait state. For the transition to the wait state, in which the supply of the signal $\phi_{CPU}$, that is, a clock source for the CPU, is suspended, the CPU activates the control signal $C_{SEL}$ of the system clock specifying means 6, and also activates the signal $M_{STP}$ of the main clock suspension selecting means 7, thereby halting the oscillation of the main oscillator 1. Thus, the suspension instructing signal $S_{SEL}$ of the system clock suspension instructing means 12 undergoes a low to high transition. This operation for activating the suspension instructing signal $S_{SEL}$ is performed by latching a data outputted from the CPU to the data bus 100 with the D Flip-flop 12a synchronously with the write signal WR as described with reference to FIG. 7.

Next,, the CPU executes the wait instruction. When the output signal WT of the wait control circuit 5 undergoes a low to high transition at a time $t_1$ shown in FIG. 8, i.e., at a time when the divided clock $\phi_2$ is at a low level and he system clock $\phi_0$ is at a fall as shown in FIG. 8, the signal $\phi_{CPU}$ from the AND gate 52 undergoes a high to low transition, thereby halting the CPU. Simultaneously, the output S of the NAND gate 13 undergoes a high to low transition, and the system clock $\phi_0$ outputted by the clock selecting circuit 8 undergoes a high to low transition to be suspended. Therefore, from this time on, it is the sub oscillator 2 for the low speed operation, the first frequency divider circuit 9 and the timer 10 alone that are operated in the microcomputer until the wait state is terminated at the time $t_2$.

In the case where an interrupt request is made due to, for example, the overflow of the timer 10 before the time $t_2$, the wait control circuit 5 makes the output, signal WT undergo a high to low transition synchronously with a fall of the sub clock $\phi_S$ at the time $t_2$. As a result, the wait state is released, and the clock selecting circuit 8 starts to supply the sub clock $\phi_S$ as the system clock $\phi_0$. Simultaneously, the second frequency divider circuit 4 starts to supply the signal $\phi_{CPU}$, thereby resuming the operation of the CPU.

In the above-mentioned case, since the supply of the clocks, that is, the primary operation for releasing the wait state, is resumed, it is not particularly necessary to clear the D flip-flop 12a in the system clock suspension instructing means 12. In this embodiment, however, when the wait state is released, the wait clear signal outputted by the wait-control circuit 5 to the system clock suspension instructing means 12 is activated at the time $t_2$, thereby clearing the D flip-flop 12a. As the wait clear signal, for example, an interrupt request signal or the output signal WT o the wait control circuit is used.

Figure 9:
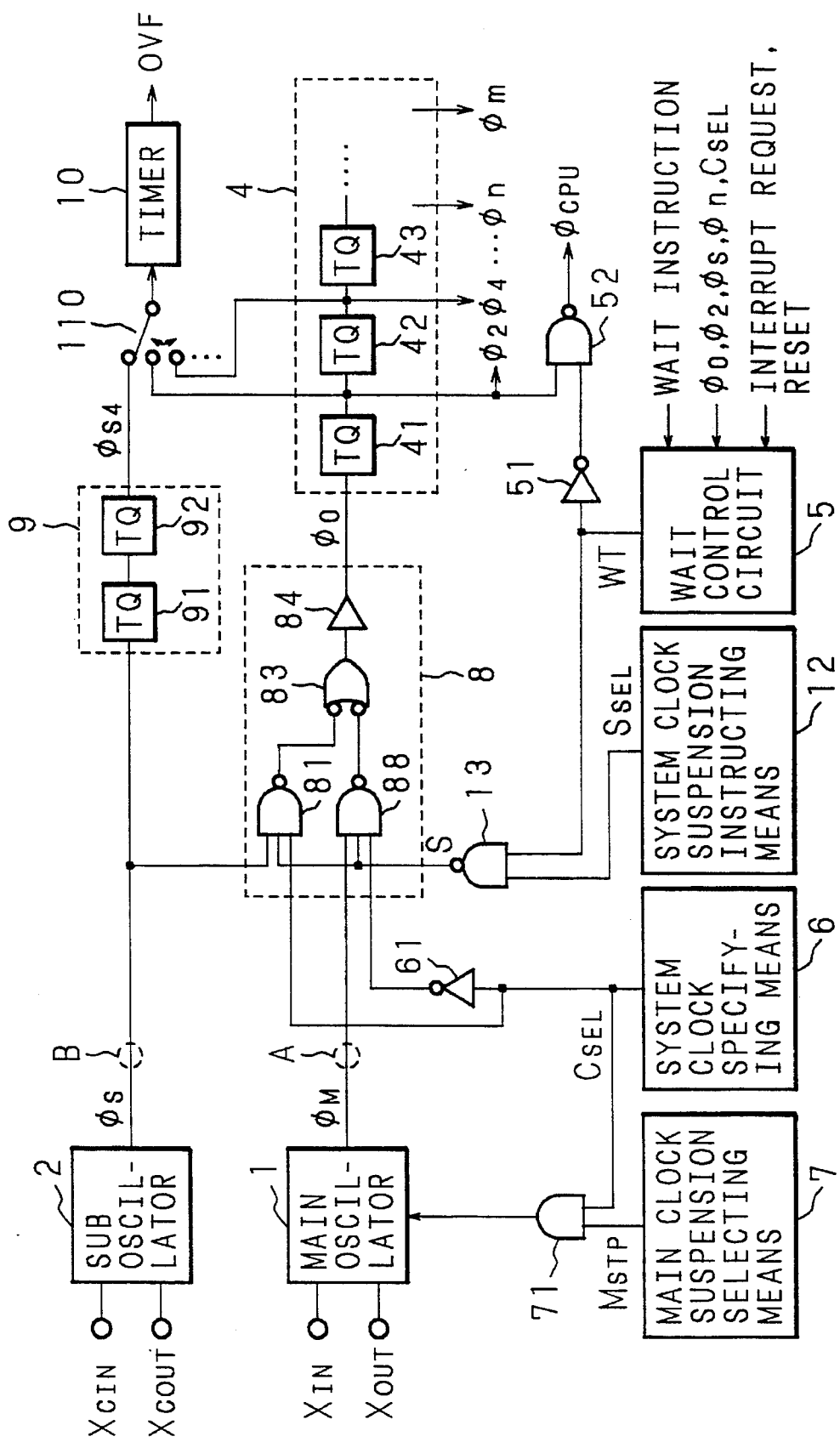
FIG. 9 is a block diagram of a clock control circuit according to another embodiment of the invention.

In the aforementioned embodiment, the clock suspension function in the wait state is effected only when the sub clock $\phi_S$ is selected. It is possible, however, to halt the system clock $\phi_0$ after activating the suspension instructing signal $S_{SEL}$ of the system clock suspension instructing means 12 and the output signal WT of the wait control circuit. 5. This can be attained by the configuration of the clock control circuit as is shown in a block diagram of FIG. 9. This type of clock control circuit is similar to that shown in FIG. 4 except that the output S of the NAND gate 13 is supplied to NAND gates 81 and 88. Therefore, the same reference numerals are used to refer to the same elements used in FIG. 4, and the description is omitted. In this clock control circuit, the supply of the system clock $\phi_0$ can be suspended even while the main clock $\phi_M$ is being used, thereby decreasing the power to be consumed.

Figure 10:
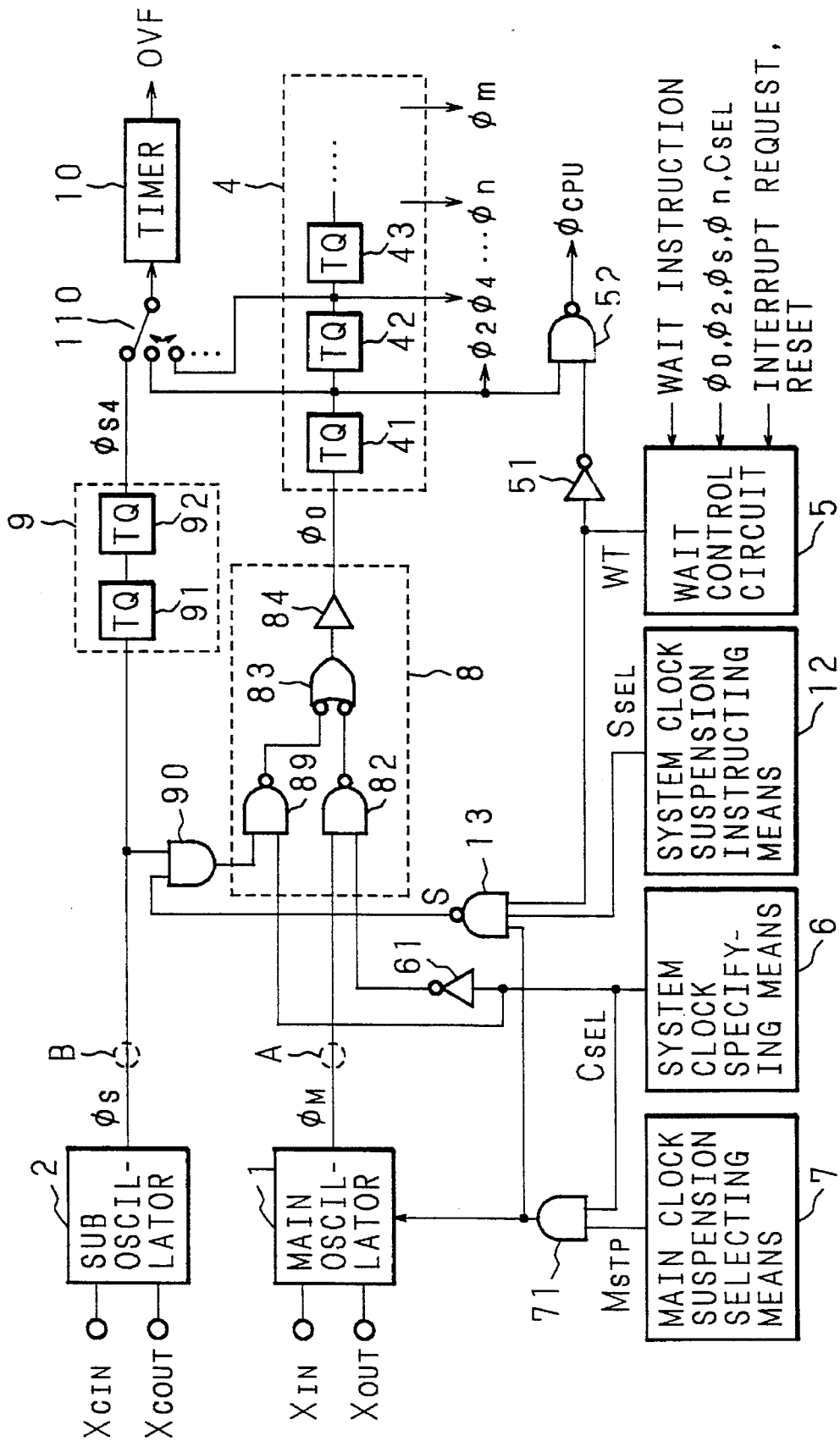
FIG. 10 is a block diagram of a clock control circuit according to still another embodiment of the invention.

Also, in the aforementioned embodiment, the output S of the NAND gate 13 is supplied to the NAND gate 81 in the clock selecting circuit 8, and hence, the NAND gate 81 works both for the clock suspending function in the wait state and the selecting function for the sub clock $\phi_S$. As an alternative method, means for the clock suspending function can be provided at the external of the clock selecting circuit 8. This can be attained by another type of clock control circuit having the configuration as is shown in FIG. 10. This clock control circuit includes a two-input AND gate 90, one input terminal of which receives the output S of the NAND gate 13 and the other input terminal of which receives the sub clock $\phi_S$. The clock control circuit further includes a two-input NAND gate 89, one input, terminal of which receives the output of the AND gate 90 and the other input terminal of which receives the control signal $C_{SEL}$. The configuration of this clock control circuit except for the AND gate 90 and the NAND gate 89 is identical to that shown in FIG. 4. Therefore, the same reference numerals are used to refer to the same elements in FIG. 4 and the description is omitted. In this type of clock control circuit, it is possible to suspend the supply of the clock at the external of the clock selecting circuit. 8.

Figure 11:
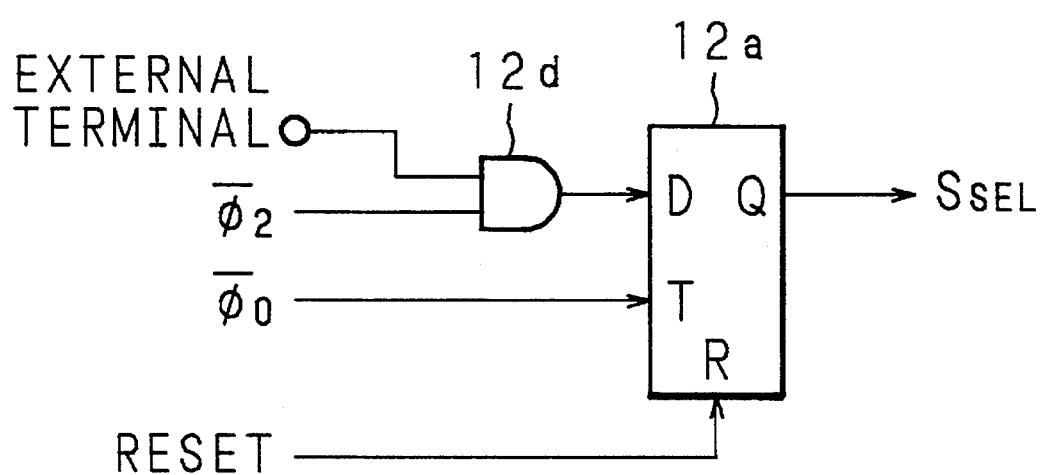
FIG. 11 is a circuit diagram showing another exemplified configuration of the system clock suspension selecting means of the invention.

Further, in the aforementioned embodiment, the system clock suspension instructing means 12 is constructed with a register (i.e., the D flip-flop 12a) in which a data from the CPU is written. It is possible, however, to set the system clock suspension instructing means 12 by using an externally inputted signal. This can be attained by another type of clock control circuit; having a partial configuration as is shown in FIG. 11. In this clock control circuit, the system clock suspension instructing means 12 outputs the suspension instructing signal $S_{SEL}$ in response to an external instruction for suspending the system clock $\phi_0$. At this point, the wait clear signal from the wait control circuit 5 is not inputted.

Moreover, an output set value in the system clock suspension instructing means 12 can be incorporated into the clock control circuit as, for example, an option specified by a user like a mask option.

Furthermore, the input of the reset, signal for the D flip-flop 12a does not have to be always conducted at the time of releasing the wait state. For example, the system clock suspension instructing means 12 can be cleared when the stop instruction for halting the oscillation of the sub clock $\phi_S$ is executed or when this stop state is released.

Moreover, in the aforementioned embodiment, the signal $M_{STP}$ from the main clock suspension selecting means 7 is activated in order to halt the system clock $\phi_0$, namely, in order t,o make tile output, S undergo a high to low transition. The system clock $\phi_0$, however, can be suspended by activating the suspension instructing signal $S_{SEL}$ from the system clock suspension instructing means 12, the control signal $C_{SEL}$ from the system clock specifying means 6 and the output signal WT from the wait control circuit 5.

Further, the T flip-flop 41 in the second frequency divider circuit 4 and the T flip-flop 91 in the first frequency divider circuit 9 can be disposed at points A and B shown in FIG. 4, respectively. When they are thus positioned, the frequency of the clock inputted to the clock selecting circuit. 3 is halved in using the system clock $\phi_0$, thereby further decreasing the power to be consumed in the clock selecting circuit 3.

In addition, in the aforementioned embodiment, each of the T flip-flops 91 and 92 in the first frequency divider circuit 9 has two sections, and hence, the sub clock $\phi_S$ is quartered. The number of the sections in the T flip-flop, however, is not limited to two, but can be increased as far as the count accuracy of the timer 10 and the increased number of the sections in the T flip-flop can be equilibrated. This also applies to the case where the T flip-flop 91 is disposed at the point B in FIG. 4.

Further in the aforementioned embodiment, the sub clock $\phi_S$ and its divided clock are supplied to the timer 10 alone. It is also possible to supply the clocks outputted by the first frequency divider circuit 9 to any other peripherals, if necessary.

The condition for releasing the wait state includes, as described above, an external interrupt and an internal interrupt by a device contained in the clock control circuit such as the timer. When no external interruption occurs, the wait statue can be released by an internal interrupt. When the system clock $\phi_0$ is instructed to be suspended in the wait state as in the aforementioned embodiment., however, the timer 10 alone is operated in the clock control circuit. Therefore, the timer 10 alone can make the internal interrupt for releasing the wait state. Accordingly, if the circuit is placed in the wait state, for example, without setting a data for releasing the wait state in the timer, it is impossible to release the wait state.

Figure 12:
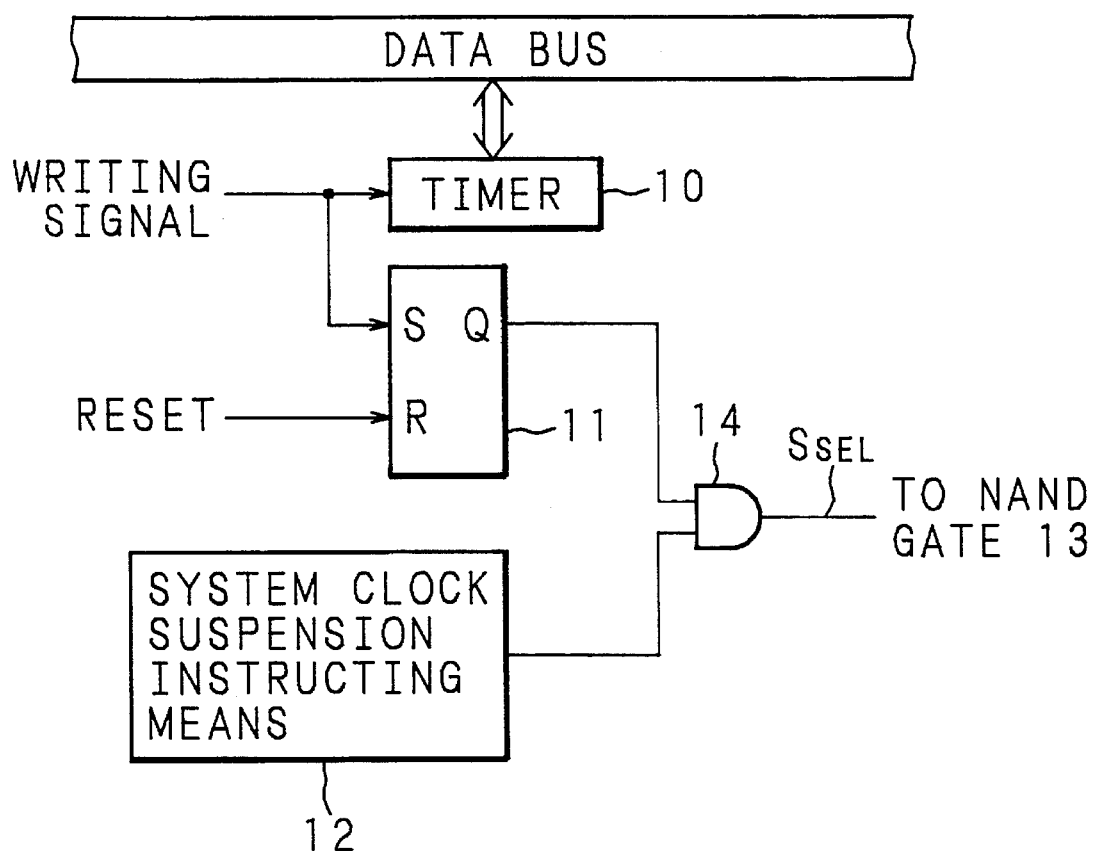
FIG. 12 is a block diagram showing part of the configuration of the clock control circuit of FIG. 4.

The configuration for avoiding this disadvantage will be described referring to FIG. 12 showing part of the configuration of the clock control circuit of FIG. 4. As is shown in FIG. 4, the divided clock of the sub clock $\phi_S$ is input ted to the timer 10, and the write signal is also inputted to the timer 10, thereby writing a specified count value until the time of releasing the wait state. The write signal is also input ted to a decision register 11, whose output signal is supplied to an AND gate 14. The suspension instructing signal $S_{SEL}$ outputted by the system clock suspension instructing means 12 is inputted to the AND gate 14. The suspension instructing signal $S_{SEL}$ outputted by the system clock suspension instructing means 12 is also supplied to the AND gate 14, thereby allowing the suspension instructing signal $S_{SEL}$ to be outputted to the NAND gate 13 shown in FIG. 4 in response to the write signal alone.

The timer 10 outputs an overflow signal OVF when it counts up to the specified count value. Alternatively, in using a conveyer type timer, the timer outputs a signal corresponding to the specified count value. The wait state is released in response to such a signal.

In the clock control circuit having such configuration as mentioned above, the system clock is instructed to be suspended only when the condition for releasing the wait state is set in the timer 10. Therefore, the timer 10 can be used as a kind of a watch dog timer. Thus, the hang-up that makes it impossible to recover the circuit from the wait state can be prevented.

As described above, the clock control circuit of this invention has the configuration that allows only the peripherals using the sub clock as the clock source to be operated in the wait state. Therefore, it is possible to decrease the power to be consumed. Further, since the peripherals used in the wait state are supplied with a clock obtained by dividing the sub clock four times or more, it is possible to further decrease the power to be consumed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A clock control circuit built in a microcomputer, comprising:

a first oscillator for generating a high frequency clock;

a second oscillator for generating a low frequency clock;

a clock selecting circuit for receiving the clocks generated by said first and second oscillators and selecting one of the clocks as a system clock;

system clock specifying means for specifying which of the clocks is to be selected by said clock selecting circuit;

a wait control circuit for controlling setting/releasing of a wait state, where supply of said system clock to a CPU is suspended, without halting generation of the clocks by said first and second oscillators;

system clock suspension instructing means for instructing suspension of output of said system clock from said system clock selecting circuit in the wait state; and means for suspending the output of said system clock when said system clock suspension instructing means instructs the suspension of the output of said system clock.

2. A clock control circuit according to claim 1, wherein said system clock suspension instructing means includes a register in which a data from a CPU for instructing the suspension of the output of said system clock is written.

3. A clock control circuit according to claim 2, wherein said register is cleared when said wait control circuit releases the wait state.

4. A clock control circuit according to claim 1 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait state, wherein said wait control circuit, releases the wait state when said wait control circuit identifies an overflow signal outputted by said timer.

5. A clock control circuit according to claim 1 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait state, wherein said wait control circuit releases the wait state when said wait control circuit identifies a signal corresponding to a set value written in said timer.

6. A clock control circuit according to claim 1 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait, state; and decision means for deciding whether a set value has been written in said timer, wherein said system clock suspension instructing means is placed into an output enable state when said decision means decides that said set value has been written in said timer.

7. A clock control circuit according to claim 4, wherein said divided clock is obtained by dividing said low frequency clock generated by said second oscillator four times or more.

8. A clock control circuit according to claim 5, wherein said divided clock is obtained by dividing said low frequency clock generated by said second oscillator Four times or more.

9. A clock control circuit built in a microcomputer, comprising:

a first oscillator for generating a high frequency clock;

a second oscillator for generating a low frequency clock;

a clock selecting circuit for receiving the clocks generated by said first and second oscillators and selecting one of the clocks as a system clock;

system clock specifying means for specifying which of the clocks is to be selected by said clock selecting circuit;

a wait control circuit for controlling setting/releasing of a wait state, where supply of said system clock to a CPU is suspended, without halting generation of the clocks by said first and second oscillators;

system clock suspension instructing means for instructing suspension of output of said system clock from said system clock selecting circuit in the wait state; and means for interrupting transfer of said high frequency clock from said first oscillator to said clock selecting circuit and/or means for interrupting transfer of said low frequency clock from said second oscillator to said clock selecting circuit, when said system clock suspension instructing means instructs the suspension of the output of said system clock.

10. A clock control circuit, according to claim 9, wherein said system clock suspension instructing means includes a register in which a data from a CPU for instructing the suspension of the output of said system clock is written.

11. A clock control circuit according to claim 10, wherein said register is cleared when said wait control circuit releases the wait state.

12. A clock control circuit according to claim 9 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait state, wherein said wait control circuit releases the wait state when said wait control circuit identifies an overflow signal outputted by said timer.

13. A clock control circuit according to claim 9 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait state, wherein said wait control circuit releases the wait state when said wait control circuit identifies a signal corresponding to a set value written in said timer.

14. A clock control circuit according to claim 9 further comprising:

a timer receiving one of said low frequency clock generated by said second oscillator and a divided clock generated by dividing said low frequency clock as a clock source, and receiving one of said low frequency clock and said divided clock even when the output of said system clock is suspended in the wait state; and decision means for deciding whether a set value has been written in said timer, wherein said system clock suspension instructing means is placed into an output enable state when said decision means decides that said set, value has been written in said timer.

15. A clock control circuit according to claim 12, wherein said divided clock is obtained by dividing said low frequency clock generated by said second oscillator four times or more.

16. A clock control circuit according to claim 13, wherein said divided clock is obtained by dividing said low frequency clock generated by said second oscillator four times or more.

* * * * *